United States Patent [19]

Zanichelli

[11] 4,165,111

[45] Aug. 21, 1979

[54] COLLAR FOR GAS PIPELINES

[75] Inventor: Gianni Zanichelli, Milan, Italy

[73] Assignee: RACI S.p.A., Milan, Italy

[21] Appl. No.: 835,445

[22] Filed: Sep. 21, 1977

Related U.S. Application Data

[63] Continuation-in-part of Ser. No. 747,018, Dec. 3, 1976, abandoned.

[30] Foreign Application Priority Data

Jul. 1, 1977 [IT] Italy ............................. 25340 A/77

[51] Int. Cl.² ................................................ E16L 21/06
[52] U.S. Cl. ................................. 285/419; 24/16 PB; 138/112
[58] Field of Search ............... 16/108, 109; 24/16 PB, 24/16; 138/112, 113, 114; 285/322, 373, 419

[56] References Cited

U.S. PATENT DOCUMENTS

| 420,076 | 1/1890 | Kohlmyer | 285/419 X |
| 1,411,930 | 4/1922 | Peterson | 16/109 |
| 3,229,998 | 1/1966 | Pennington | 285/419 |
| 3,374,308 | 3/1968 | Haas | 138/113 X |
| 3,540,487 | 11/1970 | LoRusso | 138/112 |
| 3,625,549 | 12/1971 | Vries | 285/373 X |
| 3,886,630 | 6/1975 | Emery | 24/16 PB |

*Primary Examiner*—Louis Rimrodt
*Attorney, Agent, or Firm*—Joseph W. Molasky & Associates

[57] ABSTRACT

A collar for fitting onto a pipe, particularly for the purpose of inserting said pipe into another without damaging the lagging on the pipe of smaller diameter. Said collar consists of a flexible band with meshing teeth, which is wrapped about a pipe and its ends. This collar is secured by bringing said teeth into contact and thus closing the band around said pipe.

13 Claims, 11 Drawing Figures

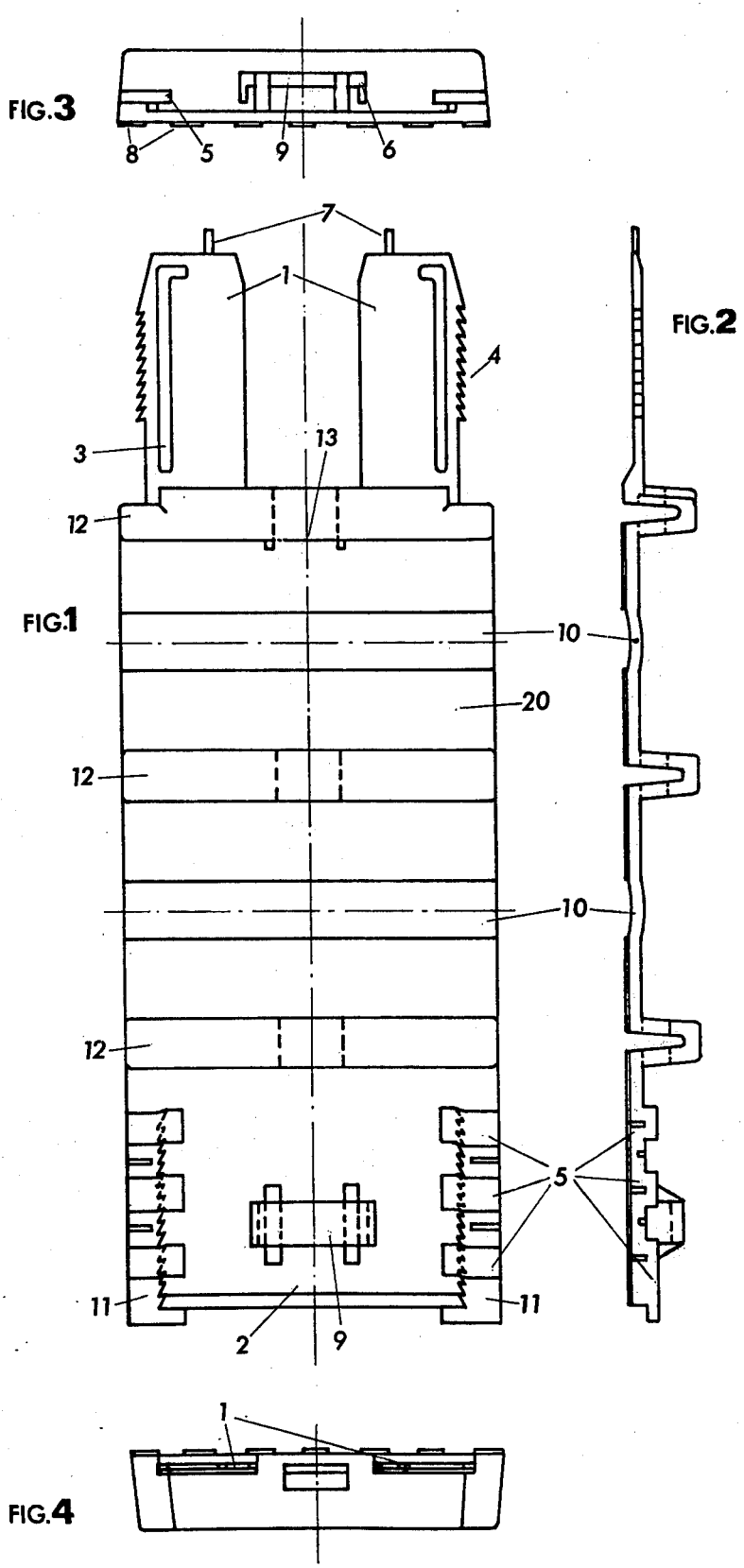

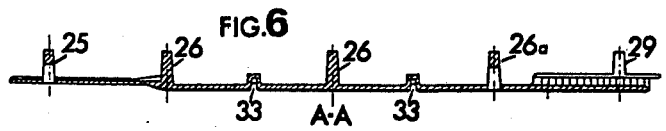
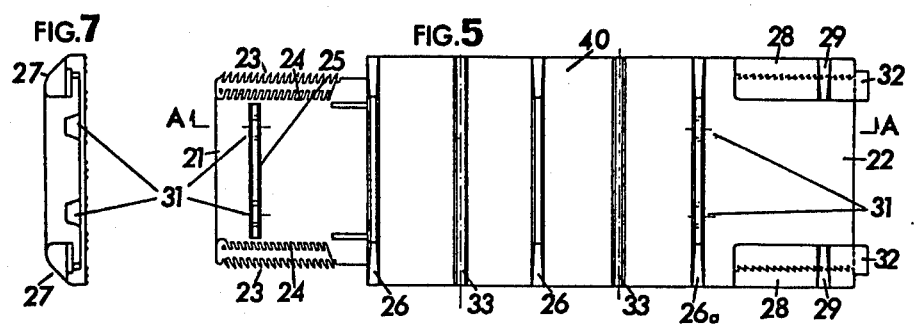
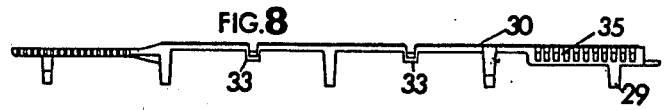
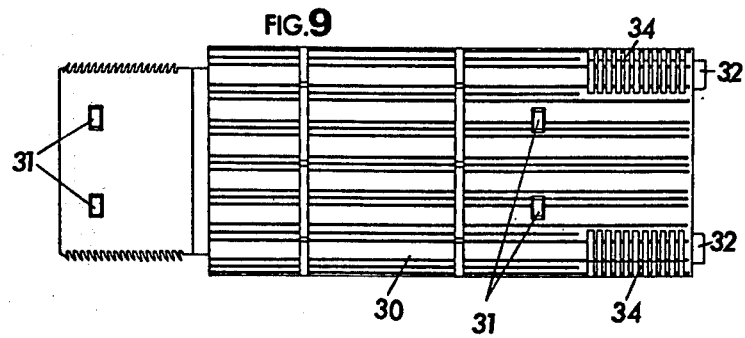
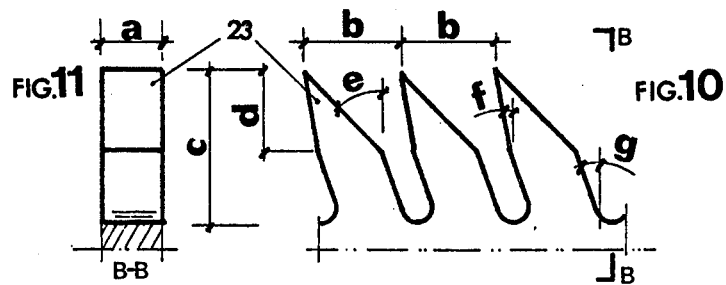

COLLAR FOR GAS PIPELINES

This is a Continuation-In-Part of applicant's copending Application No. 747,018 filed Dec. 3, 1976 now abandoned.

This invention relates to a collar for fitting onto a pipe as, for example, for fitting onto a gas pipeline, in order to insert said pipe into another without fear of damaging the lagging on the pipe of smaller diameter. This would arise for example where a gas pipeline has to pass through railway ballast.

Another object of this invention is to utilize the collar to electrically isolate one pipe from another, as in the case of metal pipes.

A further object is to provide means whereby a pipe which is inserted into another pipe can be made coaxial therewith, so that in case of a gas leakage from the inner pipe the gas is able to flow freely into the interspace between the two pipes and can be conveyed to predetermined points.

It is known in the art to utilize collars comprised of two or more plastic segments joined together by metal bolts. These known collars are complicated and require as many collars as there are pipe diameters.

We have now discovered a new type of collar which, in addition to attaining the aforesaid objects, also avoids the disadvantage of known collars. Further advantages will be evident from the description given hereinafter.

The collar of this invention consists essentially of a flexible band of adequate thickness as, for example, from 1 to 10 mm, which is wound about the pipe. This collar is secured to the said pipe by its collar ends, which are provided with rows of teeth parallel to the band axis. These teeth are inserted into each other by bringing the teeth of said rows into intimate contact with one another, said teeth having a profile which allows for such insertion and, also, to prevent withdrawal. Moreover, the teeth of each end are preferably offset, it having been found, surprisingly, that this facilitates the introduction of the male end into the female end. An improved clamping means is thus ensured.

The flexible band may be of any suitable material as, for example, reinforced plastic.

To simplify the insertion of said teeth, at least the male end of the collar comprises cuts or slots in proximity to the rows of teeth, preferably, parallel to said rows. To facilitate clamping of the collar about the pipe, the collar may be provided at its ends with projections by which a clamping action may be exerted.

For this purpose, suitable plier provided with two arms, are preferably employed, the ends of which engage in said protrusions. Upon closing the pliers, the male end is forced into the female end to perfectly clamp the collar.

The male end may for example be constructed in a single piece or in two pieces. In the first case, the corresponding clamping protrusion may be disposed towards the extremity of the male ends. This position of said protrusion is preferable because once the male end has entered the female end, traction may be exerted on the collar ends rather than thrust, thus aiding rapid clamping.

The collar is also provided externally with ribs normal to the band axis to enable the inner pipe to be centered relative to the outer pipe. The centering ribs may be of different height to vary the interspace between the tubes.

These ribs are generally three in number, and they are disposed 120° to each other. However, the number of ribs may vary as, for example, when a number of collars are joined together. This will be evident from the description given hereinafter.

The ribs are advantageously provided at their ends with a lead-in for facilitating introduction of the inner pipe.

Also, the collar is preferably provided on its inner face with longitudinal projections of triangular profile to enable it to better adhere to the pipe to which it is fitted, so as to prevent it from sliding, especially during the insertion of one pipe into the other.

According to one embodiment the instant collar is fitted onto a pipe in the form of a flexible band comprising:

(1) a male end possessing two rows of teeth which lie parallel to the band axis and extend outwardly and laterally in respect to the band;

(2) an opposite end which provides two individual rows of meshing teeth for accepting and securing the toothed male end; and (3) centering ribs which traverse the width of the collar and which are positioned normal to the band axis.

To utilize this collar the toothed male end is secured to the meshing teeth of the opposite end by inserting the former through an aperture which brings the toothed male end and meshing teeth into an intimate and securing contact with one another.

This contact is facilitated by an aperture which accepts the toothed male end and guides it into intimate contact with the meshing teeth. As the toothed male end is inserted into this aperture, several plates located above the meshing teeth, and an overhanging guide member located opposite said plates, maintain the toothed male end on a plane parallel to that of the meshing teeth. As a result, the toothed male end and meshing teeth come into intimate contact with one another and are thus secured. In this device the guide members and plates are disposed at essentially the same height from the collar base.

In a preferred collar of this invention the teeth of the male end and the meshing teeth of the opposite end are staggered to assure a secure contact with each other.

The practicality of the present collar is further illustrated by the following embodiment.

Instead of using one collar for each pipe diameter, it is possible and convenient to join together several analogous collars and fit the resulting collar so obtained onto the pipe. For example, using only two types of elementary collars, type B of length 295 mm (development) and type A of length 180 mm, it is possible to cover the entire range of nominal pipe diameters from 3″ to 30″. This use is illustrated by the following Table.

| Nominal pipe diameter, inches | Number of Collars | |
|---|---|---|
| | Type A | Type B |
| 3 | — | 1 |
| 4 | 2 | — |
| 5 | 1 | 1 |
| 6 | 3 | — |
| 7 | — | 2 |
| 8 | 4 | — |
| 10 | — | 3 |
| 10 (alternative) | 5 | — |
| 12 | 4 | 1 |
| 14 | 3 | 2 |
| 16 | 4 | 2 |

-continued

| Nominal pipe diameter, inches | Number of Collars | |
|---|---|---|
| | Type A | Type B |
| 18 | 8 | — |
| 20 | 9 | — |
| 22 | 10 | — |
| 24 | 11 | — |
| 24 (alternative) | 1 | 6 |
| 26 | 10 | 1 |
| 28 | 1 | 7 |
| 30 | 10 | 2 |
| 30 (alternative) | 2 | 7 |

As can be observed from said Table, a collar may be formed by n elementary collars of type A and m elementary collars of type B, opportunely combined in function of the pipe diameter, wherein n may vary from 0 to 11 and m may assume the following values: 0, 1, 2, 3, 6 and 7.

DRAWINGS

FIG. 1 is a plan view of the outer surface of the collar when extended;

FIG. 2 is a side view of the collar of FIG. 1;

FIG. 3 is an elevational view of the female end of the collar of FIG. 1;

FIG. 4 is an elevational view of the male end of the collar of FIG. 1;

FIG. 5 is a plan view of the outer surface of a second type collar extended;

FIG. 6 is a section through the collar of FIG. 5 on the line A—A;

FIG. 7 is an elevational view of the female end of the collar of FIG. 5;

FIG. 8 is a side view of the collar of FIG. 5;

FIG. 9 is a plan view of the inner surface of the collar of FIG. 5;

FIG. 10 is a plan view of the teeth of the male end;

FIG. 11 is a side view of FIG. 10 along B—B.

EMBODIMENTS

This invention is illustrated by two embodiments. The first of these Example 1, covers the collar of FIGS. 1-4.

Example 2 constitutes a preferred embodiment of this invention and it is illustrated by FIGS. 5-11.

EXAMPLE 1

As seen in FIGS. 1-4, the male end 1 of collar 20 is in two equal segments and both segments are provided on the outside with teeth 4. Slots 3 are disposed in proximity and parallel to the rows of teeth 4 to facilitate introduction of the male end 1 into the end 2. The end 2 is provided with guide plates 5 below which rows of teeth 11 are disposed. The bridge 9 is provided with guide members 6 for the purpose of keeping the male end 1 lowered, in cooperation with plates 5, while it is being inserted into end 2. The row teeth 11 and teeth 4 which engage one another are of acute angled profile and they are oriented in such manner that the male end 1 and end 2 cannot be withdrawn from each other once engaged.

At the male end 1 there are disposed two protrusions 7 which may be easily removed to allow further clamping of the collar onto the pipe. This is to take account of any variation in the thickness of the lagging on the pipe.

It can be seen that the collar 20 is provided with three transverse centering ribs 12 which are located in a position normal to the band axis for the purpose of enabling the inner pipe to be centered relative to the outer pipe.

In addition, the collar 20 is provided with two corrugations 10 which help in wrapping the collar about the pipe, and longitudinal projections 8 which prevent the collar moving along the pipe once it has been positioned and tightened thereon.

Clamping of the collar onto the pipe is facilitated by the projections 13 and 9, to which force may be applied as, for example, by pliers.

EXAMPLE 2

A second collar and a preferred embodiment of this invention is illustrated by FIGS. 5-9.

In this collar, the terminal end 21 of collar 40 is a single unit and it is provided with two rows of mutually offset teeth 23 having an acute angle profile. The terminal end 21 is also provided with lightening grooves 24 to provide greater flexibility, and a rib 25 which is perforated at 31. These perforations provide an improved means for centering and facilitate application of the collar via clamping pliers.

The central part of the collar is provided with two resilient raised portions 33 which, internally, are partially hollow so as to afford good flexibility to the collar. This central part of the collar also possesses centering ribs 26 and 26a, the latter of which is provided with two perforations 31 which, in cooperation with those of rib 25, allow the pliers to be applied. Lugs 29 and ribs 26, and 26a are shaped with a lead-in 27 at their ends to allow the collar being mounted on the pipe to overcome any obstacles as, for example weld seams and to improve slideability. Lugs 29 and ribs 26 and 26a are all useful in centering but lugs 29 are particularly useful in this regard.

The collar end 22 is provided with two toothed guides 28 of "["cross-section with the teeth disposed on the vertical side of said "[", and they receive collar end 22 and prevent it from withdrawing. Meanwhile, two outwardly projecting tongues 32 facilitate the insertion of terminal end 21 into collar end 22. The teeth of these two ends mutually engage to prevent separation.

The toothed guides 28 are lightened laterally at 35 and lowerly at 34, to increase their resilience.

The inner surface of the collar is provided with longitudinal projections 30 of triangular cross-section to increase the grip on the pipe or on any lining thereof and to prevent collar movement.

Particularly effective are teeth 23 belonging to terminal end 21 of the collar as represented in FIGS. 10 and 11. The shape of said teeth 23 was realized after a number of studies and experiments.

The teeth at collar end 22 have a naturally complementary profile but their height is about half of teeth 23. The optimal dimensions of teeth 23 which have a pitch of 4 mm are hereafter indicated in mm: $a=b=4$; $c$ from 4.8 to 6.2, $d=2.5$, $e=45°$, $f=10°$, $g=20°$.

As can be seen from the c values, the terminal end 21 is slightly tapered toward the external edge. This allows for an easier insertion of terminal end 21 into collar end 22. As in the first embodiment of FIGS. 1-4, each of the end teeth are preferably staggered to afford seventeen on one side and 18 on the other side.

I have described this invention with particularity and with reference to specific examples but it is to be understood that functionally equivalent material and obvious modifications in construction can be made to this invention without departing from the scope and spirit thereof. Insofar as any such substitutions and modifications are within the purview of the artisan to perform, those changes are considered as being within the scope of this invention.

What is claimed is:

1. A collar for fitting onto a pipe in the form of a flexible band comprising:
   (a) a male end possessing two rows of teeth which lie parallel to the band axis and extend outwardly and laterally in respect to the band;
   (b) an opposite end which provides two individual rows of meshing teeth for accepting and securing the toothed male end; and
   centering ribs which traverse the width of the collar and which are positioned normal to the band axis.

2. A collar according to claim 1 wherein the male end is secured to the meshing teeth of the opposite end by inserting the male end into the toothed guides provided in the opposite end.

3. A collar according to claim 2 wherein the toothed male end is brought into a securing contact with the meshing teeth by inserting the former into an aperture comprising:
   (a) several plates disposed above each row of meshing teeth; and
   (b) corresponding guide members disposed at essentially the same height as the said plates (a) and opposite thereto.

4. A collar according to claim 1 wherein the teeth of each end are staggered.

5. A collar according to claim 4 wherein the teeth have a pitch of 4 mm.

6. A collar according to claim 1 wherein the ends are provided with transverse projections for clamping the collar through a traction action to be exerted once the opposite ends are brought into contact.

7. A collar according to claim 6 wherein the transverse projections are of the same height as the centering ribs.

8. A collar according to claim 6 wherein the centering ribs and transverse projections are furnished with inclined ends to facilitate the introduction of the tube fitted with a collar into another tube.

9. A collar according to claim 1 wherein longitudinal projections having a triangular section are provided on the internal surface of the collar.

10. A collar according to claim 1 wherein the male end is provided with two easily removable protrusions.

11. A collar according to claim 1 for fitting onto tubes of 3-30 inch diameter, obtained by connecting together several individual collars.

12. A collar according to claim 1 characterized by longitudinal projections which provide an improved adherence of the collar to the pipe to which it is fitted.

13. A collar as claimed in claim 1 wherein the ends are provided with guide members by which the clamping of the collar onto the pipe is facilitated.

* * * * *